US010656424B2

(12) United States Patent
Yoshida et al.

(10) Patent No.: US 10,656,424 B2
(45) Date of Patent: *May 19, 2020

(54) INFORMATION DISPLAY TERMINAL, INFORMATION DISPLAY SYSTEM, AND INFORMATION DISPLAY METHOD

(71) Applicant: MAXELL, LTD., Kyoto (JP)

(72) Inventors: Susumu Yoshida, Tokyo (JP); Satoshi Ouchi, Tokyo (JP); Yukinobu Tada, Tokyo (JP); Tadashi Kuwabara, Tokyo (JP); Yoshiho Seo, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,486

(22) Filed: Jul. 11, 2019

(65) Prior Publication Data

US 2019/0331927 A1    Oct. 31, 2019

Related U.S. Application Data

(63) Continuation of application No. 15/106,894, filed as application No. PCT/JP2014/050513 on Jan. 15, 2014, now Pat. No. 10,386,637.

(51) Int. Cl.
*G02B 27/01* (2006.01)
*G09G 3/00* (2006.01)
(Continued)

(52) U.S. Cl.
CPC ..... *G02B 27/0172* (2013.01); *G02B 27/0093* (2013.01); *G06F 1/163* (2013.01);
(Continued)

(58) Field of Classification Search
None
See application file for complete search history.

(56) References Cited

U.S. PATENT DOCUMENTS 6,346,929 B1    2/2002  Fukushima et al.
6,636,249 B1 *  10/2003 Rekimoto ............... G06F 3/002
                                                         345/419
(Continued)

FOREIGN PATENT DOCUMENTS

CN    103488745 A    1/2014
JP    08-006708 A    1/1996
(Continued)

OTHER PUBLICATIONS

International Search Report of PCT/JP2014/050513 dated Apr. 28, 2014.
(Continued)

*Primary Examiner* — Kent W Chang
*Assistant Examiner* — Peijie Shen
(74) *Attorney, Agent, or Firm* — Mattingly & Malur, PC

(57) ABSTRACT

In a wearable information display terminal, information related to an object is displayed at a timing required by a user in an easily recognized form. Photography is performed in a field-of-vision direction, a first object is detected from a first image obtained by the photography, relevant information related to the first object is acquired from a network, and a second image related to the relevant information is generated. A second object different from the first object is detected from the first image, the second object is used as a display trigger, and the second image is displayed when the second object is close to the first object.

4 Claims, 11 Drawing Sheets

(51) Int. Cl.
*G06F 3/14* (2006.01)
*G02B 27/00* (2006.01)
*G06F 1/16* (2006.01)
*G06F 3/01* (2006.01)

(52) U.S. Cl.
CPC ........... *G06F 3/011* (2013.01); *G06F 3/14* (2013.01); *G09G 3/001* (2013.01); *G02B 2027/014* (2013.01); *G02B 2027/0138* (2013.01); *G02B 2027/0141* (2013.01); *G02B 2027/0178* (2013.01); *G06F 3/013* (2013.01); *G09G 2354/00* (2013.01); *G09G 2370/022* (2013.01)

(56) References Cited

U.S. PATENT DOCUMENTS

| | | | | |
|---|---|---|---|---|
| 10,045,091 | B1* | 8/2018 | Nijim | H04N 21/2668 |
| 10,386,637 | B2* | 8/2019 | Yoshida | G06F 3/011 |
| 2007/0132663 | A1* | 6/2007 | Iba | G06F 3/013 |
| | | | | 345/8 |
| 2009/0278766 | A1* | 11/2009 | Sako | G06F 3/011 |
| | | | | 345/8 |
| 2011/0158478 | A1* | 6/2011 | Yamada | G02B 6/0006 |
| | | | | 382/103 |
| 2012/0263154 | A1* | 10/2012 | Blanchflower | H04L 67/38 |
| | | | | 370/338 |
| 2013/0010103 | A1* | 1/2013 | Ihara | G08G 1/04 |
| | | | | 348/116 |
| 2013/0083007 | A1* | 4/2013 | Geisner | G06T 19/006 |
| | | | | 345/419 |
| 2013/0335303 | A1* | 12/2013 | Maciocci | G06F 3/011 |
| | | | | 345/8 |
| 2014/0225924 | A1* | 8/2014 | Loxam | G06T 19/006 |
| | | | | 345/633 |
| 2014/0240225 | A1* | 8/2014 | Eilat | G06F 3/017 |
| | | | | 345/156 |
| 2014/0253591 | A1* | 9/2014 | Hayakawa | G06T 19/006 |
| | | | | 345/633 |
| 2014/0320404 | A1* | 10/2014 | Kasahara | G06F 1/1694 |
| | | | | 345/156 |
| 2014/0368533 | A1* | 12/2014 | Salter | G02B 27/017 |
| | | | | 345/619 |
| 2015/0070389 | A1* | 3/2015 | Goto | G06T 7/00 |
| | | | | 345/633 |
| 2015/0227222 | A1* | 8/2015 | Sako | G06F 3/011 |
| | | | | 345/173 |
| 2016/0018885 | A1* | 1/2016 | Kimura | G06F 3/011 |
| | | | | 345/156 |
| 2016/0089980 | A1* | 3/2016 | Kurahashi | G06F 3/013 |
| | | | | 345/156 |
| 2016/0291691 | A1* | 10/2016 | Lee | G09G 3/003 |
| 2017/0046879 | A1* | 2/2017 | Severn | H04N 5/23293 |
| 2017/0103583 | A1* | 4/2017 | Poulos | G06T 19/006 |
| 2017/0116479 | A1* | 4/2017 | Ouchi | G06F 3/04886 |

FOREIGN PATENT DOCUMENTS

| | | |
|---|---|---|
| JP | 2006-119297 A | 5/2006 |
| JP | 2007-163634 A | 6/2007 |
| JP | 2010-067083 A | 3/2010 |
| JP | 2010-210822 A | 9/2010 |
| JP | 2011-028763 A | 2/2011 |
| JP | 2011-166589 A | 8/2011 |
| JP | 2012-008290 A | 1/2012 |

OTHER PUBLICATIONS

Chinese Office Action received in corresponding Chinese Application No. 201480072277.3 dated Jul. 4, 2017.
Japanese Office Action received in corresponding Japanese Application No. 2018-052754 dated Jan. 8, 2019.

* cited by examiner

INFORMATION DISPLAY TERMINAL, INFORMATION DISPLAY SYSTEM, AND INFORMATION DISPLAY METHOD

TECHNICAL FIELD

The present invention relates to an information display terminal, an information display system, and an information display method.

BACKGROUND ART

Various kinds of methods have been proposed as an information display method related to a so-called wearable information display terminal that displays predetermined information using a goggle-type or glasses-type head mounted display.

For example, Patent Document 1 discloses a method of switching an information display mode between a summary mode and a detailed mode according to a situation of a user. Further, for example, Patent Document 2 discloses a method of combining information input by the user through an input unit with information photographed by an imaging unit and displaying combined information according to a situation of a real world specified by a current position or object information.

CITATION LIST

Patent Document

Patent Document 1: JP 2007-163634 A
Patent Document 2: JP 2011-28763 A

SUMMARY OF THE INVENTION

Problems to be Solved by the Invention

A difference between a glasses-type wearable information display terminal and a mobile terminal such as a smartphone lies in that, when predetermined information is acquired, in the mobile terminal, the user should actively takes a look at display content provided by the mobile terminal, whereas in the wearable information display terminal, the user can confirm information display passively within a field of vision when it is in an operation state. However, in the wearable information display terminal, since the information display starts and ends regardless of the will of the user, particularly, the information display is performed even when unnecessary, and thus the user may feel annoyed according to circumstances.

In the technique of the related art disclosed in Patent Document 1, the information display mode is switched according to a situation such as whether the user is walking, viewing a display video, or speaking but how to determine a timing at which the user desires information related to an arbitrary object to be displayed and how to start or end the display of the information related to the object were not particularly taken into account.

In the technique of the related art disclosed in Patent Document 2, the information related to the object input by the user is combined with the information photographed by the imaging unit, the combined information is displayed, but similarly, how to start or end the display of the information related to the object at an effective timing was not particularly taken into account.

The present invention was made in light of the foregoing, and it is an object of the present invention to provide an information display terminal and an information display method, which are capable of starting or ending display of information related to an object at an appropriate timing and displaying the information in a form easily recognized by the user in a wearable information display terminal or the like.

Solutions to Problems

The object is achieved, for example, by the inventions stated in claims.

Effects of the Invention

According to the present invention, there is an effect that display of information related to an object can be started or ended at an appropriate timing, display information can be displayed in a form easily recognized by the user, and convenience of the user in, for example, the wearable information display terminal can be improved.

MODE FOR CARRYING OUT THE INVENTION

Hereinafter, embodiments of the present invention will be described with reference to the appended drawings.

First Embodiment

Figure 1:
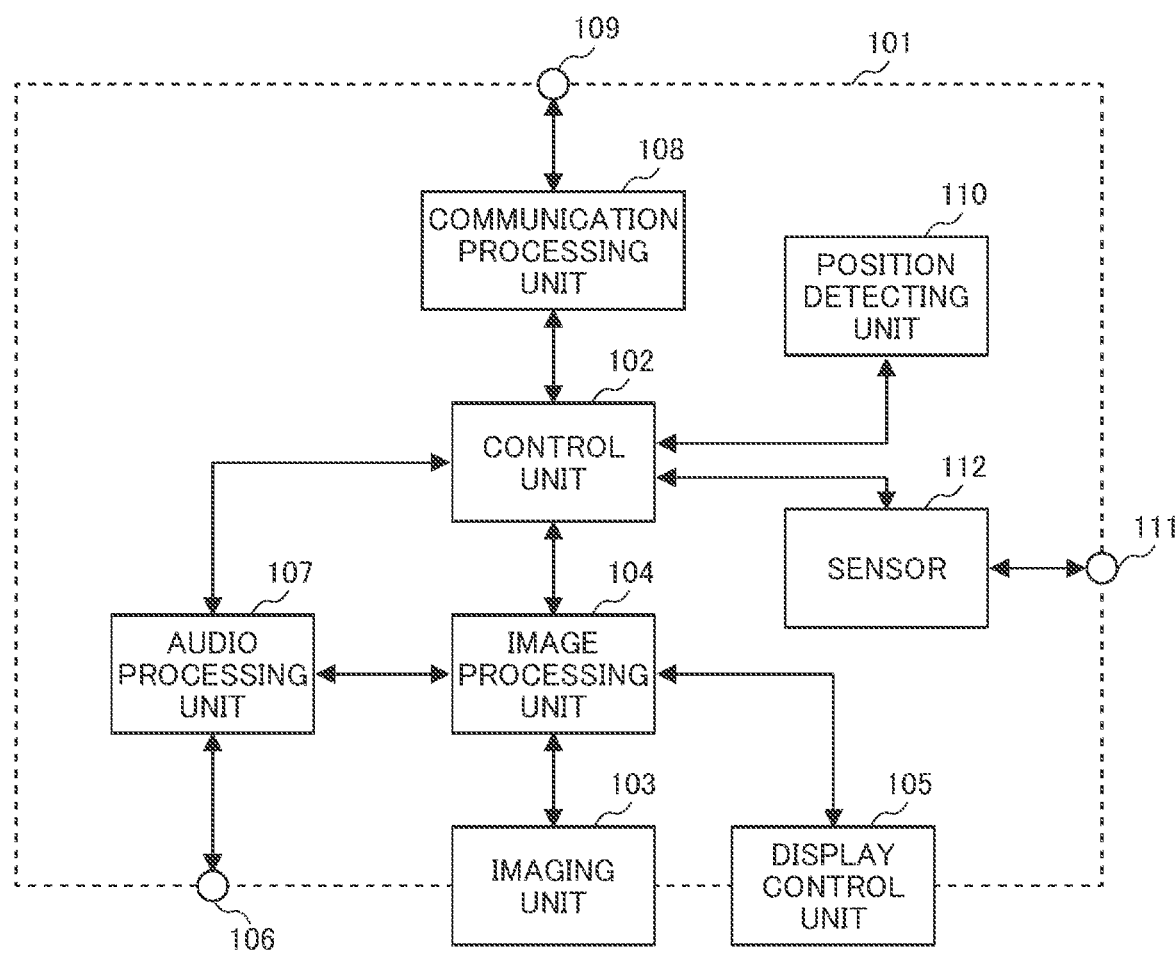
FIG. 1 is a block diagram illustrating an example of a configuration of an information display terminal.

FIG. 1 is a block diagram illustrating an example of a configuration of an information display terminal 101. The first embodiment will be described using this.

101 denotes an information display terminal, 102 denotes a control unit that controls the information display terminal 101 in general, 103 denotes an imaging unit, 104 denotes an image processing unit, 105 denotes a display control unit, 106 denotes an audio input/output unit corresponding to a microphone or an earphone, 107 denotes an audio processing unit, 108 denotes a communication processing unit, 109 denotes a communication input/output unit, 110 denotes a position detecting unit including a global positioning system (GPS), 111 denotes a sensor input/output unit, and 112 denotes an various kinds of sensors.

The communication input/output unit 109 is connected with a network through wireless communication. In the present embodiment, an example in which the information display terminal 101 is connected directly to the Internet or the like and acquires information will be described. However, the information display terminal 101 may perform communication with an information terminal (for example, a smartphone) serving as a separate device through near filed communication (NFC) such as Bluetooth (a registered trademark), and the information terminal may perform a connection with the Internet or the like and a main process.

The information display terminal 101 is a head mounted display equipped with at least the imaging unit 103 and the display control unit 105. As various kinds of sensors 112, a plurality of sensors such as an inclination sensor that detects a posture of the user, an acceleration sensor that detects a motion of the user, a visual line sensor or a temperature sensor that detects a body state of the user, and a pressure sensor or a capacitance sensor used as an input/output interface (I/F) that detects an instruction input of the user can be mounted.

Figure 2:
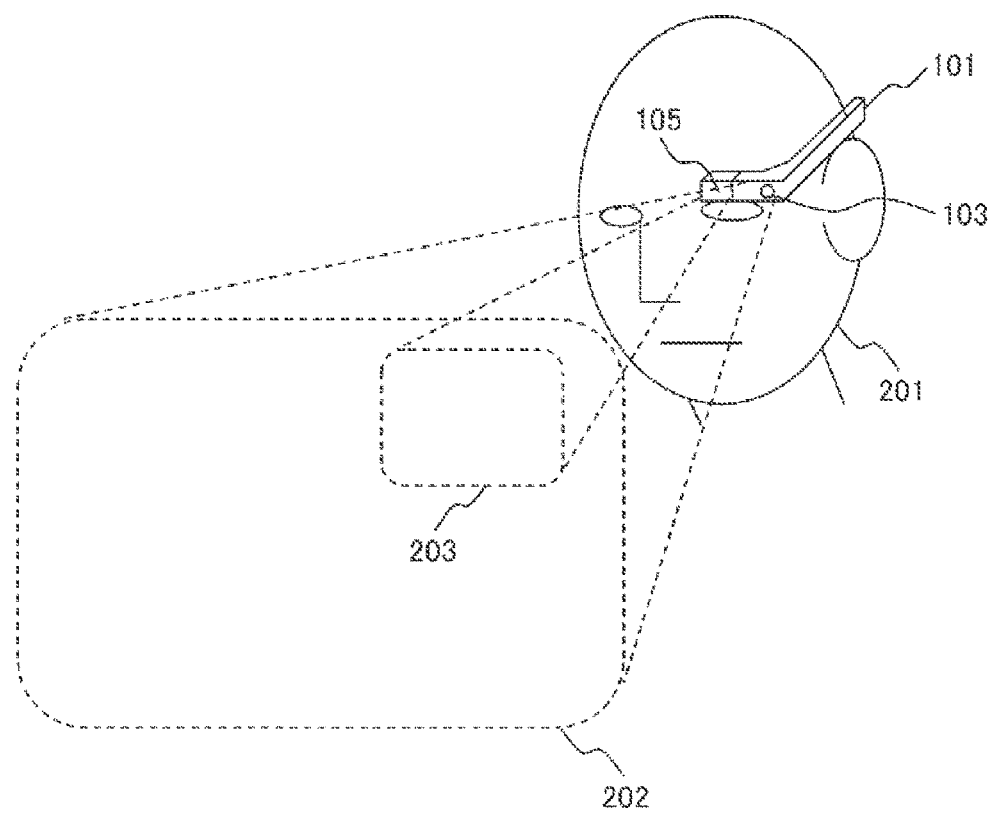
FIG. 2 is a sketch diagram illustrating an example in which a user wears an information display terminal.

FIG. 2 is a sketch diagram illustrating an example in which the user wears the information display terminal 101. Components that are common to those of FIG. 1 are denoted by the same reference numerals.

201 denotes the user, 202 schematically indicates an area of a first image captured by the imaging unit 103, and 203 schematically indicates an area of a second image displayed through the display control unit 105. The area of the second image is not limited to a size or a range indicated by 203 and may have a size or a range capable of covering a field of vision widely. The information display terminal 101 can have any form as long as it is worn on the head, and the display control unit 105 that projects, for example, light according to information within the field of vision of the user 201 and displays information and the imaging unit 103 capable of imaging the field-of-vision direction of the user 201 are arranged. For example, the information display terminal 101 may be a glasses-type information display terminal, a goggle-type information display terminal, an information display terminal worn on one eye, or an information display terminal worn on both eyes and is not limited to the exemplary form illustrated in FIG. 2.

The image processing unit 104 analyzes the first image of the area 202 photographed by the imaging unit 103 and detects a predetermined object included in the first image. Information indicating a feature of the detected object, for example, information indicating a feature related to a pattern which will be described later is transmitted to the network through the communication processing unit 108, and the information related to the object accordingly acquired from the network is supplied to the image processing unit 104. The image processing unit 104 generates the second image based on the information, and supplies the second image to the display control unit 105. The display control unit 105 causes the second image to be displayed on the area 203.

For example, the display control unit 105 causes an image to be displayed on a half mirror installed at a position corresponding to the area 203 or displays the second image by projecting the second image directly onto a retina of the user 201, but when the information display terminal 101 is of a transmissive type as at least a head mounted display, and the second image is not displayed, the area 203 is set not to block the field of vision of the user 201.

Figure 3:
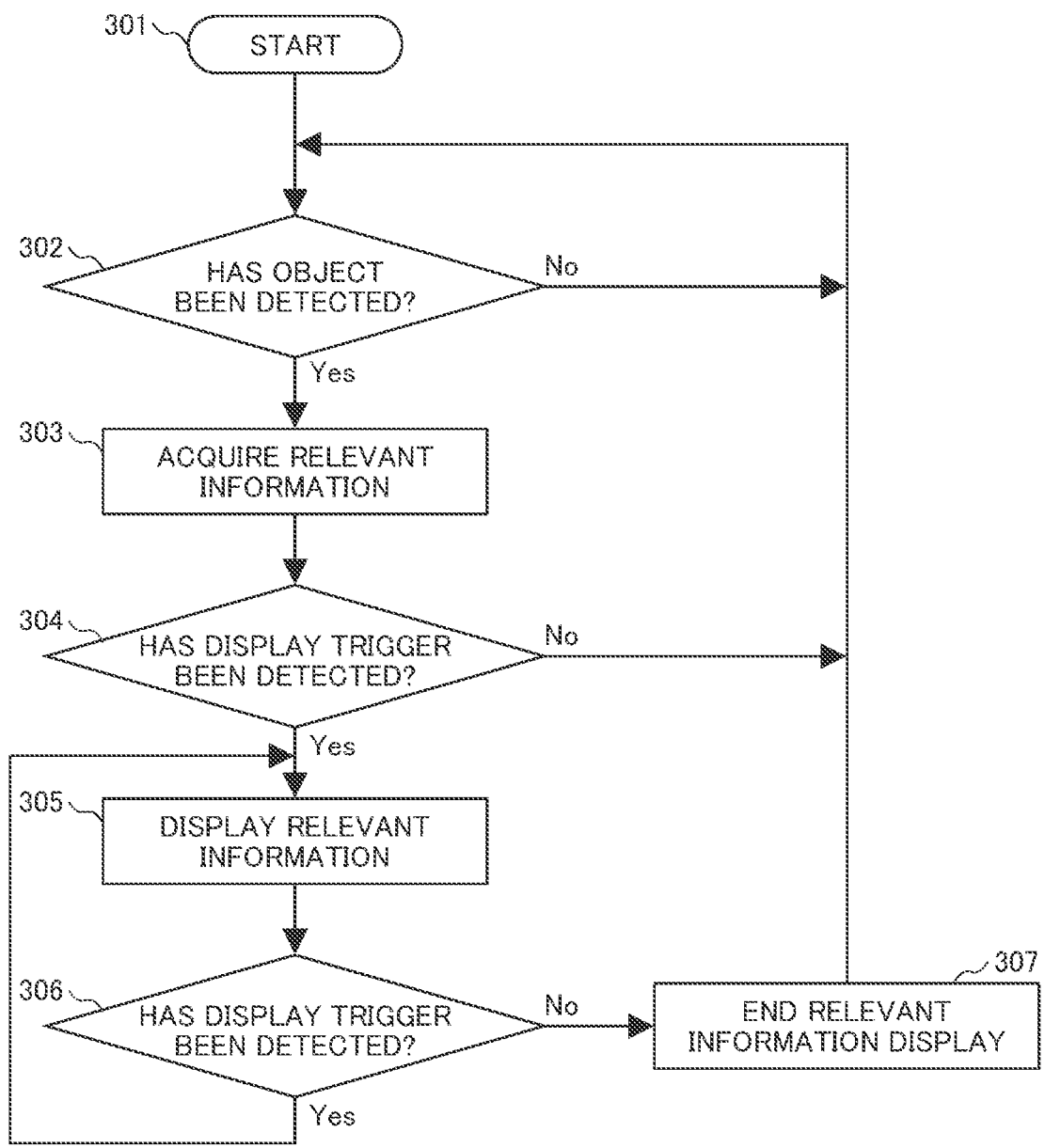
FIG. 3 is an operation flowchart according to a first embodiment.

FIG. 3 is an operation flowchart according to the first embodiment.

Figure 4A:
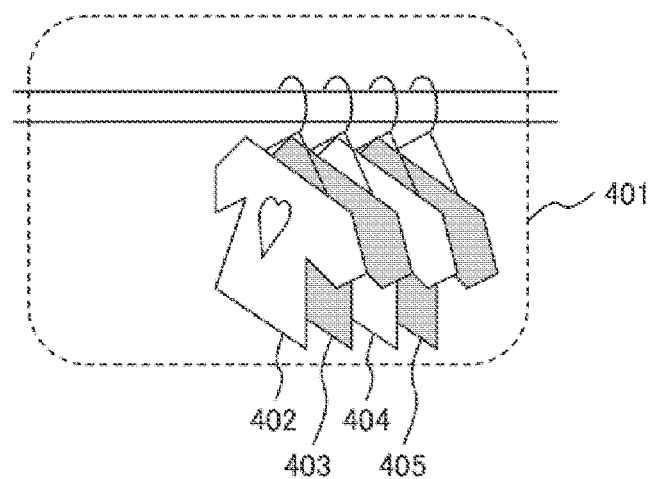
FIG. 4A is a first diagram illustrating an example of relevant information display according to the first embodiment.
Figure 4B:
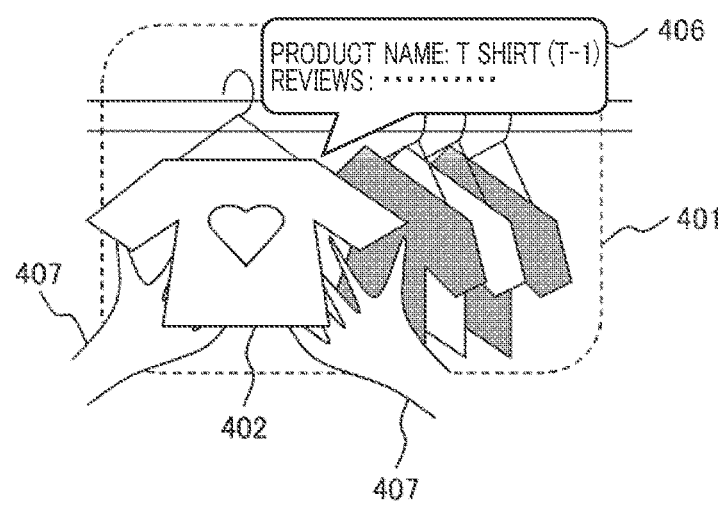
FIG. 4B is a second diagram illustrating an example of relevant information display according to the first embodiment.

FIGS. 4A and 4B are diagrams illustrating an example of relevant information display according to the first embodiment, and illustrate the field of vision of the user.

An operation of the information display terminal 101 according to the present embodiment will be described in detail with reference to FIG. 3 and FIGS. 4A and 4B. The present embodiment will be described in connection with an example in which, particularly, when the user shops around for products in stores or the like, the information display terminal 101 displays relevant information related to a predetermined object as the second image.

First, in step 301, a process starts. The whole process may be initiated by a touch input of the pressure sensor in a sensor 112 or a voice input of the user using the audio input/output unit 106. The process may start automatically when the user is recognized to stay in a store based on position information detected by the position detecting unit 110 or an image photographed by the imaging unit 103.

Then, in step 302, a predetermined object is detected. Specifically, the image processing unit 104 detects a predetermined object by performing image recognition on images consecutively photographed by the imaging unit 103 and performing matching between a plurality of clipped objects and a shape or a color of a predetermined pattern or a transform prediction value thereof. The predetermined pattern may be a default pattern (for example, a genre such as a "suit") according to store information or may be acquired from the Internet or the like in association with the store information.

When a desired production is decided, the user may designate a product name, a model number, a genre, and the like in advance, a predetermined pattern may be acquired from a server on the Internet or other public information, and predetermined object detection may be more specifically performed. The number of predetermined objects detected in step 302 is not limited to one, and a plurality of objects may be simultaneously detected in an imaging area.

When the predetermined object is detected, in step 303, relevant information about the predetermined object is acquired. Specifically, the communication processing unit 108 acquires information related to the predetermined object from the Internet or the like through the communication input/output unit 109. When the product name, the model number, and the like can be decided on based on a product tag or the like from an image of the predetermined object photographed by the imaging unit 103, the relevant information can be also acquired based on the product name, the model number, and the like.

Then, in step 304, determination of a display trigger is performed. The display trigger is a specific object for initiating the display of the second image based on the relevant information, and in this case, a "hand" is used as the display trigger. When the predetermined object is detected in step 302, although the relevant information of the predetermined object is acquired in step 303, the display of the second image is not performed unless the display trigger is photographed through the imaging unit 103 and recognized through the image processing unit 104. A method of recognizing a "hand" through the image processing unit 104 is the same method as the object recognition in step 302.

For example, as illustrated in FIG. 4A, although 402 to 405 in an imaging area 401 are detected as a predetermined object, since there is not display trigger in the imaging area 401, the display of the second image is not performed (No in step 304).

On the other hand, as illustrated in FIG. 4B, when a specific object 407 serving as the display trigger is recognized in the imaging area 401 and determined to approach a predetermined object (Yes in step 304), in step 305, the second image based on the relevant information of the specified predetermined object 402 is generated through the image processing unit 104. Further, the second image is displayed through the display control unit 105 in a form that can be recognized as information related to the predetermined object 402.

In this case, content displayed as the second image 406 is product information related to the predetermined object 402. Here, for example, reviews information or market price information related to the product are displayed in the form recognized by the user. The displayed content is preferably information useful for the user and not particularly limited. A broken line of the imaging area 401 is illustrated for the sake of convenience and not displayed within the field of vision of the user.

In step 306, the determination of the display trigger is continuously performed, and the relevant information is displayed while the display trigger is being recognized.

Further, when the position of the display trigger is changed, and a predetermined object is changed, replacing to a second image related to a changed predetermined object is performed (Yes in step 306). When the specific object 40 serving as the display trigger is hardly recognized in the imaging area 401, in step 307, the display of the second image ends, and the process returns to the detection of the predetermined object in step 302 (No in step 306).

Figure 5:
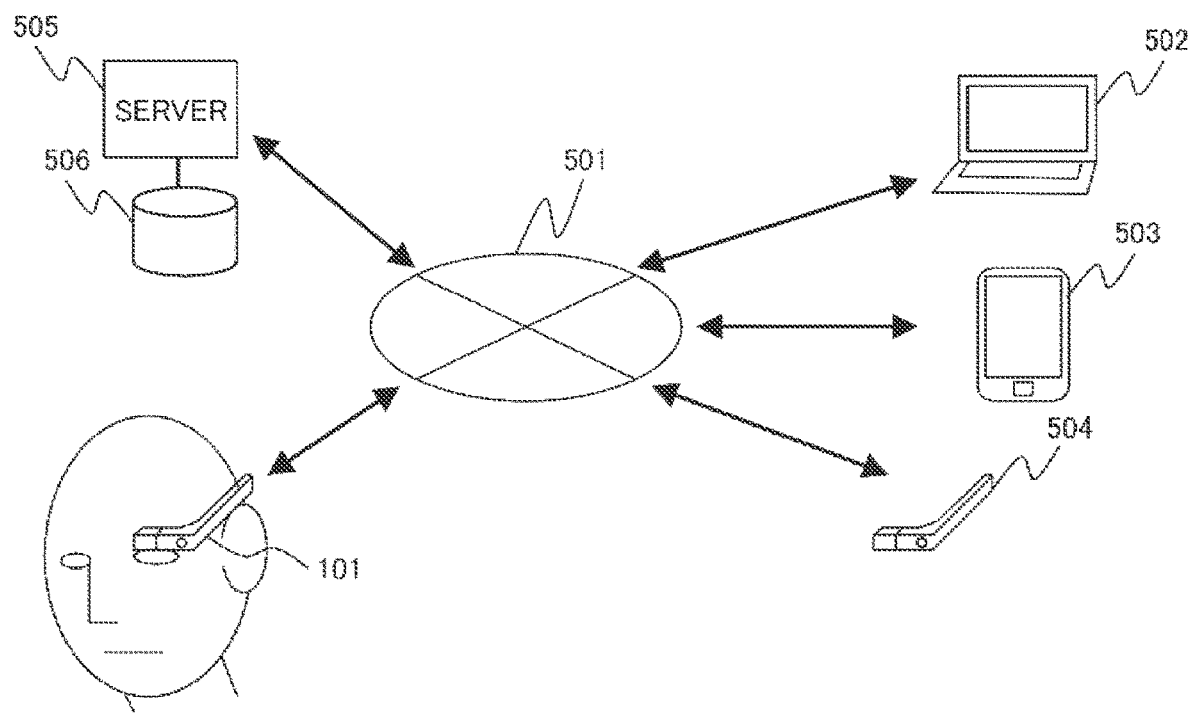
FIG. 5 is a block diagram illustrating a system configuration on a network.

FIG. 5 is a block diagram illustrating a system configuration on a network. The acquisition of the relevant information through the communication processing unit 108 will be briefly described with reference to FIG. 5.

The information display terminal 101 acquires the relevant information of the predetermined object 402 from the Internet 501 through the above-described configuration. For example, unspecified third parties transmit the information via the Internet 501 using a personal computer 502, a mobile terminal 503, an information display terminal 504, and the like, and the information is accumulated in a storage 506 by a server 505. The information display terminal 101 transmits information identifying the predetermined object 402 detected from the image photographed by the imaging unit 103, and the server 505 supplies information related to the predetermined object 402 among the information accumulated in the storage 506 to the information display terminal 101.

The server 505 collects information about predetermined stores, predetermined regions, and the like in advance, and supplies the information to the information display terminal. However, when a specific server 505 has no collected relevant information, the information display terminal 101 may searches for and acquire information related to the predetermined object 402 from information disclosed by a plurality of servers connected to the Internet.

As described above, according to the first embodiment of the present invention, the wearable information display terminal starts or ends the display of the second image for the relevant information of the predetermined object, for example, using the display trigger of causing the hand to approach the object. Thus, the display of the second image can be performed at a timing and a period of time in which a will or action of the user (for example, an action of picking up a product in a hand=a will desiring to see information related to a product) is reflected. The user can use both hands freely in the state in which the information display terminal is worn and need not operate the information display terminal 101 to select an object, and thus convenience is improved. Since a situation in which the second image is displayed at an unnecessary timing or a situation in which information about a plurality of objects is displayed simultaneously does not happen, there is an effect that a display annoying the user can be prevented.

Second Embodiment

Next, a second embodiment of the information display terminal 101 will be described with reference to FIGS. 6 to 8B. A configuration of the information display terminal 101 is basically the same as that illustrated in FIG. 1, and thus the description will proceed using the reference numerals allocated to the respective components of FIG. 1. Similarly to the first embodiment, the description will proceed with an example in which, when the user shops around a product in a store or the like, the information display terminal 101 displays the second image as relevant information about a predetermined object.

Figure 6:
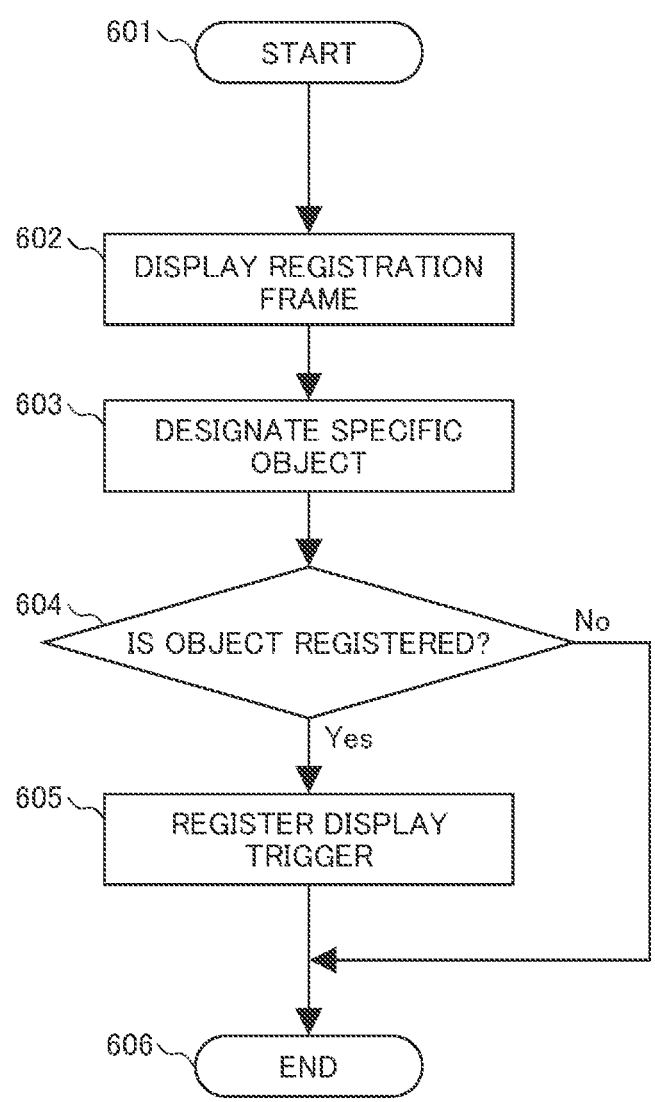
FIG. 6 is an operation flowchart according to a second embodiment.

FIG. 6 is an operation flowchart according to the second embodiment.

Figure 7:
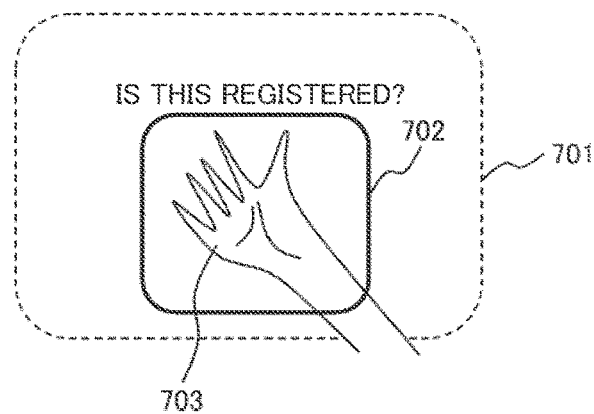
FIG. 7 is a diagram illustrating a display example at the time of display trigger registration.

FIG. 7 is a diagram illustrating a display example at the time of display trigger registration.

One of features of the present embodiment lies in that the user can register the display trigger. FIG. 6 illustrates an operation flow at the time of display trigger registration, and FIG. 7 illustrates the field of vision of the user at the time of display trigger registration.

First, in step 601, the process starts. The process may be initiated according to a user instruction given by a touch input of the pressure sensor or a voice input. Then, in step 602, a frame in which the display trigger is registered is displayed. Specifically, the image processing unit 104 generates an image indicating a registration frame, and the display control unit 105 causes a registration frame 702 to be displayed within a range of an imaging area 701 of the imaging unit 103, that is, in the field-of-vision direction of the user as illustrated in FIG. 7.

In step 603, the user positions a specific object that is desired to be registered as the display trigger to fall within the registration frame 702. In this case, a "palm" is registered as the specified object 703. Then, in step 604, when the image processing unit 104 recognizes that there is the specified object 703 within the range of the registration frame 702 from the image photographed through the imaging unit 103, an inquiry indicating whether or not the object is registered as the display trigger is given to the user. The inquiry given to the user may be a text display as illustrated in FIG. 7 or may be a voice output from the audio input/output unit 106.

When a registration instruction is given by an instruction input of the user (Yes in step 604), the specified object 703 is stored in a memory (not illustrated) in the information display terminal 101 as the display trigger. The memory is installed to be accessible from the control unit 102 or the image processing unit 104 but may be installed in the control unit 102 or the image processing unit 104. Thereafter, in step 606, the process ends. Further, in step 604, in a state in which the presence of the specified object 703 is recognized by the image processing unit 104, an image indicating a contour of the specified object 703 may be generated and displayed by the display control unit 105, and the user may be notified of the fact that the specified object 703 has been recognized through a sound output from the audio input/output unit 106.

Figure 8A:
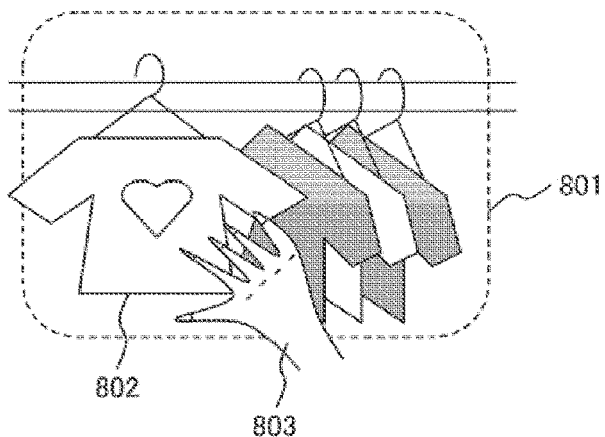
FIG. 8A is a first diagram illustrating an example of relevant information display according to the second embodiment.
Figure 8B:
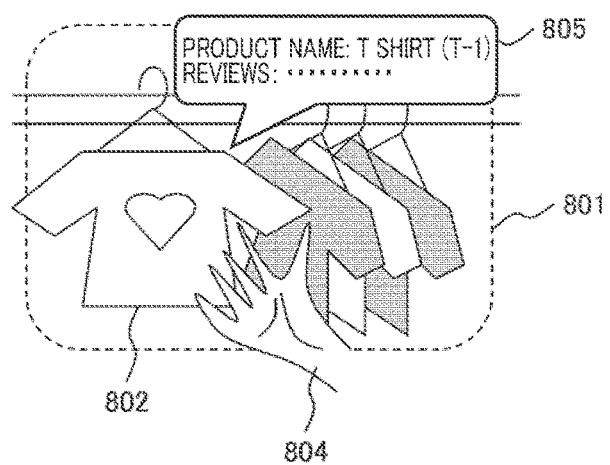
FIG. 8B is a second diagram illustrating an example of relevant information display according to the second embodiment.

FIGS. 8A and 8B are diagrams illustrating an example of the relevant information display according to the second embodiment. An example in which, when the user shops around a product in a store or the like, the information display terminal 101 displays the second image as relevant information about a predetermined object, similarly to the first embodiment will be described with reference to FIGS. 8A and 8B. Here, a "palm" is assumed to have been registered in step 605 as the specified object 703.

The operation flow is basically the same as that of FIG. 3, and thus a detailed description thereof is omitted. In the determination of the display trigger of step 304, as illustrated in FIG. 8A, there is a predetermined object 802 in an imaging area 801, and the relevant information is acquired from the Internet or the like, but since a specific object 803 is a "back of hand" and not recognized as the registered display trigger, the display of the relevant information is not performed. The image processing unit 104 performs the determination as to whether or not the specific object is identical to the registered display trigger using matching of the shape or the color of the object, the transform prediction value thereof, or the like. In FIG. 8B, a specific object 804 is a "palm" and determined to be the display trigger registered in step 605 of FIG. 6.

In step 305, the image processing unit 104 generates the relevant information of the predetermined object 802 specified by the display trigger as a second image 805. The display control unit 105 causes the second image 805 to be displayed in the form that can be recognized as information related to the predetermined object 802.

Similarly to the above description, content displayed as the second image 805 is preferably product information that relates to the predetermined object 802 and useful for the user and not particularly limited. Broken lines of the imaging area 701 and 801 are illustrated for the sake of convenience and not displayed within the field of vision of the user.

As described above, according to the second embodiment of the present invention, a specific object is registered as the display trigger in the wearable information display terminal, and thus it is possible to start or end the display of the second image according to the user's intention. Similarly to the first embodiment, the user can use both hands freely in the state in which the information display terminal is worn and need not operate the information display terminal 101 to select an object. The display trigger can be appropriately changed according to the user's desire, and thus convenience is improved.

As a modified example of the present embodiment, an embodiment in which the process is initiated by the registered display trigger in step 301 of FIG. 3 is considered. In other words, as an operation of the information display terminal 101, first, in step 301, only the determination of the display trigger is continuously performed. Then, when the object recognized by the image processing unit 104 from the image photographed through the imaging unit 103 is determined to be identical to the registered display trigger, the operations of step 302 and subsequent steps are performed. In the example of the present embodiment, a series of operations can be performed by showing a "palm" in the imaging area 401. Since the start of the operation is simple, there is an effect that the convenience of the user can be further improved.

Third Embodiment

Next, a third embodiment of the information display terminal 101 will be described with reference to FIG. 9 and FIGS. 10A and 10B. A configuration of the information display terminal 101 is basically the same as that illustrated in FIG. 1, and thus the description will proceed using the reference numerals allocated to the respective components of FIG. 1. In the present embodiment, similarly to the first embodiment, the description will proceed with an example in which, when the user shops around a product in a store or the like, the information display terminal 101 displays the second image as relevant information about a predetermined object.

Figure 9:
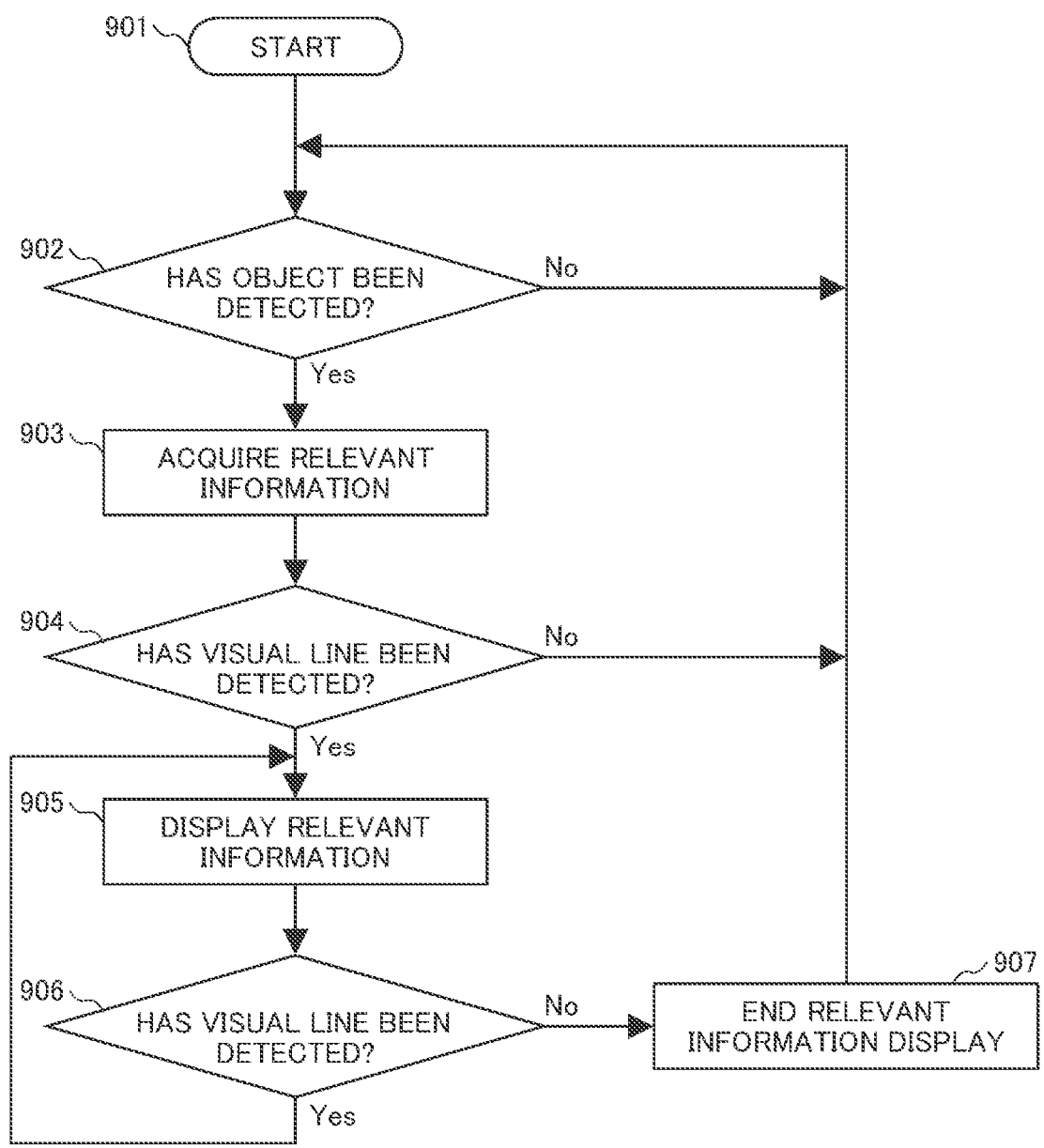
FIG. 9 is an operation flowchart according to a third embodiment.

FIG. 9 is an operation flowchart according to the third embodiment.

Figure 10A:
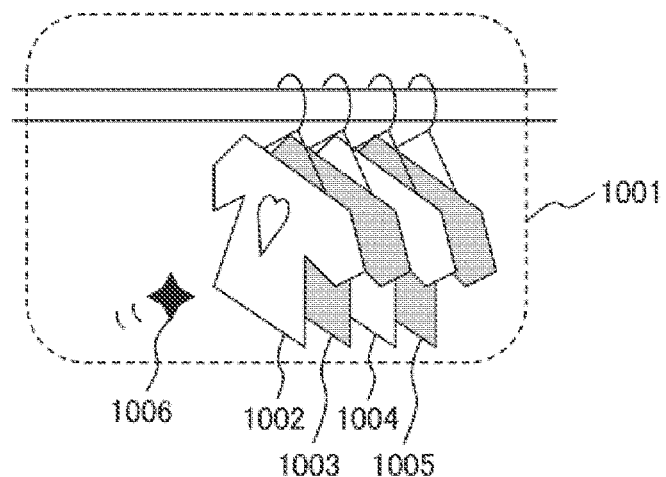
FIG. 10A is a first diagram illustrating an example of relevant information display according to the third embodiment.
Figure 10B:
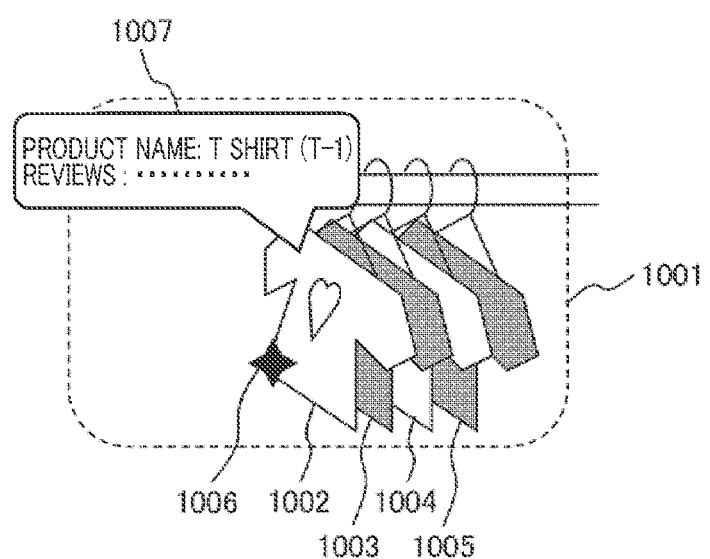
FIG. 10B is a second diagram illustrating an example of relevant information display according to the third embodiment.

FIGS. 10A and 10B are diagrams illustrating an example of the relevant information display according to the third embodiment, and illustrate the field of vision of the user.

Operations of step 901 to step 903 are the same as the operations of step 301 to step 303 in FIG. 3, and a detailed description thereof is omitted. When the process starts in step 901, in step 902, a predetermined object is detected, and in step 903, the relevant information related to the predetermined object is acquired from the Internet or the like. The number of predetermined objects detected in step 902 is not limited to one, and a plurality of objects may be simultaneously detected in an imaging area.

Then, in step 904, a visual line of the user is determined. A gazing point of the visual line of the user wearing the information display terminal 101 is detected through the visual line sensor included in the sensor 112. For the visual line sensor, for example, a method using infrared rays disclosed in Patent Document 1, a method using a complementary metal-oxide semiconductor (CMOS) sensor, and the like are known. When the gazing point falls within a range to which the detected predetermined object pertains (No in step 904), the display of the second image related to the relevant information is not performed. For example, as illustrated in FIG. 10A, although 1002 to 1005 in an imaging area 1001 are detected as the predetermined object, when a gazing point 1006 falls at none of the predetermined objects, the display of the second image related to the relevant information is not performed.

On the other hand, as illustrated in FIG. 10B, when the gazing point 1006 falls at a predetermined object 1002, and this state is continued during a predetermined period of time (for example, 3 seconds) or more (Yes in step 904), in step 905, the image processing unit 104 generates a second image 1007 as the relevant information of the predetermined object 1002, and the display control unit 105 causes the second image 1007 to be displayed in the form that can be recognized as information related to the predetermined object 1002. Similarly to the above embodiments, content displayed as the second image 1007 is the product information related to the predetermined object 1002, and for example, the reviews information or the market price information related to the product is displayed in the form easily recognized by the user.

The displayed content is preferably information useful for the user and not particularly limited. A broken line of the imaging area 1001 and the gazing point 1006 are illustrated for the sake of convenience and not displayed within the field of vision of the user. However, a mode in which an image is displayed as the mark of the gazing point 1006 may be provided so that the mark of the gazing point 1006 can be recognized by the user, and in this case, the shape of the mark is not limited to the shape of the gazing point 1006.

In step 906, the determination of the visual line is continuously performed, and the second image 1007 is displayed while the gazing point 1006 falls within the range to which the predetermined object 1002 or the second image 1007 pertains (Yes in step 906). It is because the gazing point 1006 moves to the second image 1007 side at a point in time at which the second image 1007 is displayed. Further, when the gazing point 1006 deviates from the range to which the predetermined object 1002 or the second image 1007 pertains or when the state in which the gazing point 1006 deviates is continued during a predetermined period of time (for example, 3 seconds) or more, the display of the second image 1007 ends (No in step 906), and the process returns to the detection of the predetermined object in step 902.

As described above, according to the third embodiment, in the wearable information display terminal 101, the display of the second image starts or ends according to the gazing point of the user on the relevant information of the predetermined object, and thus the display of the image can be performed at a timing and a period of time in which a will or action of the user (for example, an action of drawing attention to a product=a will desiring to see information related to a product) is reflected. Similarly to the above embodiments, the user can use both hands freely in the state in which the information display terminal 101 is worn and need not operate the information display terminal 101 to select an object, and thus convenience is improved. Since a situation in which the second image is displayed at an unnecessary timing or a situation in which information about a plurality of objects is displayed simultaneously does not happen, there is an effect that a display annoying the user can be prevented.

Fourth Embodiment

Next, a fourth embodiment of the information display terminal 101 will be described with reference to FIG. 11 and FIGS. 12A and 12B. A configuration of the information display terminal 101 is basically the same as that illustrated in FIG. 1, and thus the description will proceed using the reference numerals allocated to the respective components of FIG. 1. In the present embodiment, similarly to the first embodiment, the description will proceed with an example in which, when the user shops around a product in a store or the like, the information display terminal 101 displays the second image as relevant information about a predetermined object.

Figure 11:
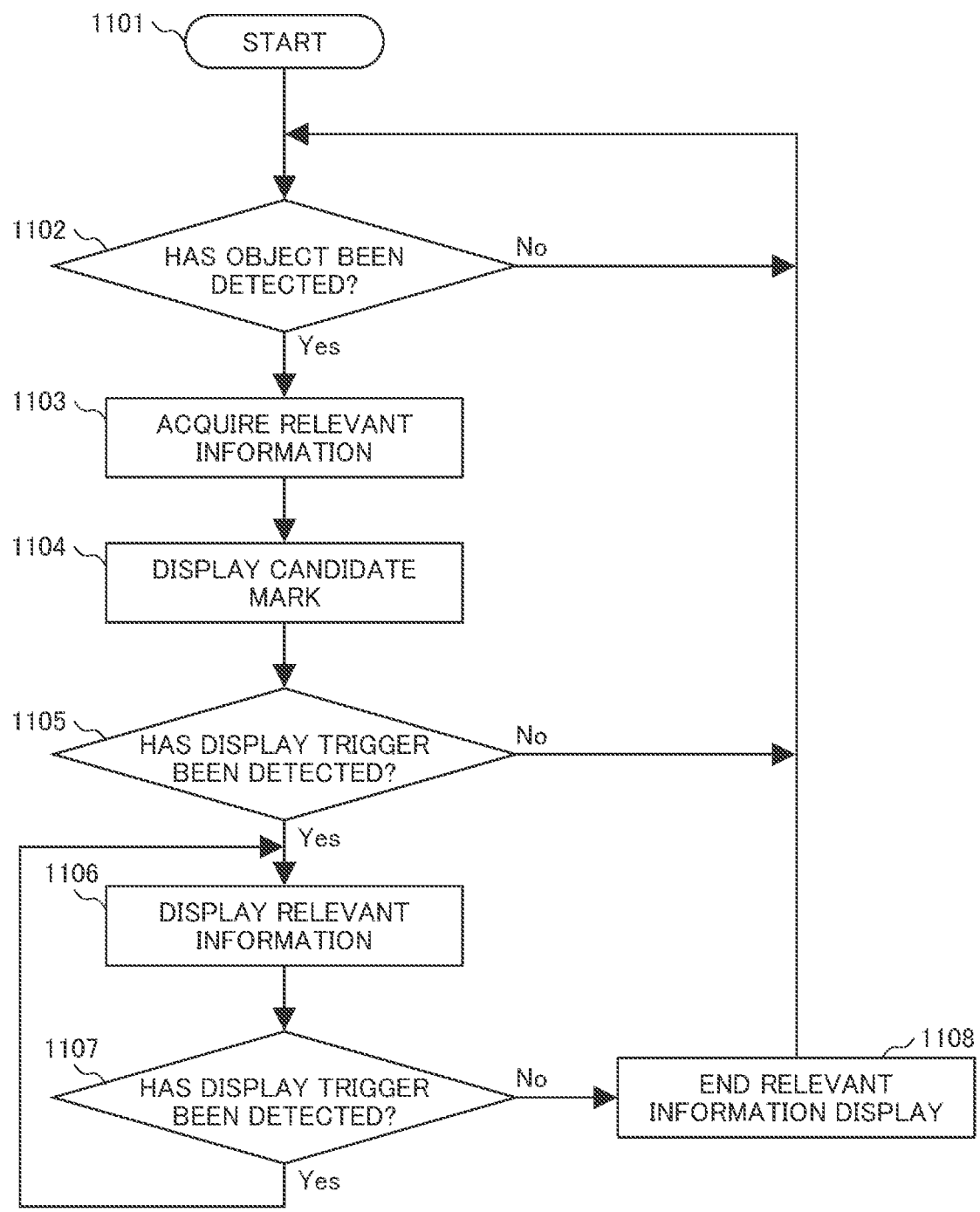
FIG. 11 is an operation flowchart according to a fourth embodiment.

FIG. 11 is an operation flowchart according to the fourth embodiment.

Figure 12A:
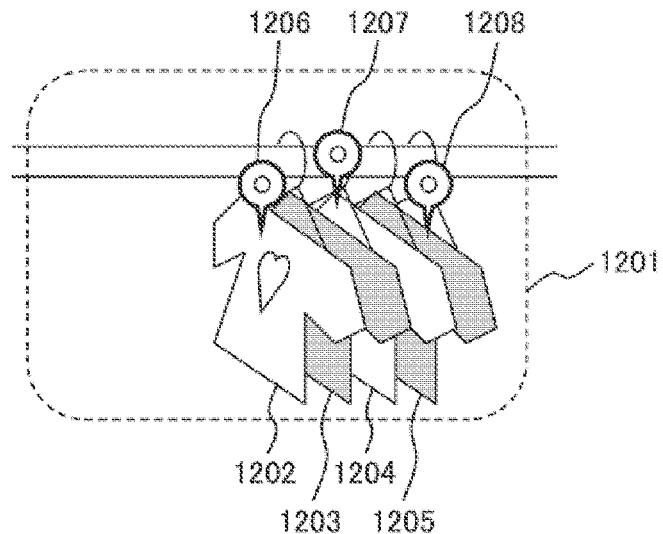
FIG. 12A is a first diagram illustrating an example of relevant information display according to the fourth embodiment.
Figure 12B:
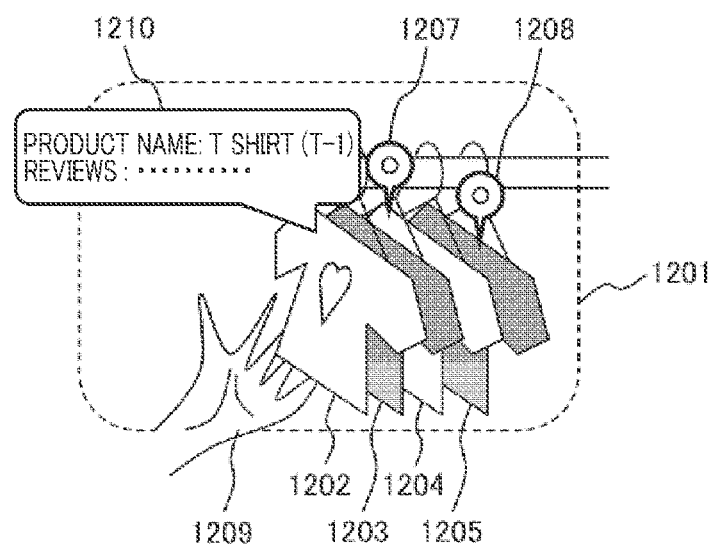
FIG. 12B is a second diagram illustrating an example of relevant information display according to the fourth embodiment.

FIGS. 12A and 12B are diagrams illustrating an example of the relevant information display according to the fourth embodiment, and illustrate the field of vision of the user.

Operations of step 1101 to step 1103 are the same as the operations of step 301 to step 303 in FIG. 3, and a detailed description thereof is omitted. When the process starts in step 1101, in step 1102, a predetermined object is detected, and in step 903, the relevant information related to the predetermined object is acquired from the Internet or the like. In the present embodiment, the description will proceed with an example in which a plurality of predetermined objects are simultaneously detected in an imaging area in step 1102.

When the plurality of predetermined objects are detected, and the relevant information is acquired, in step 1104, a candidate mark is displayed. The candidate mark refers to a mark displayed when effective relevant information is acquired for the detected predetermined object. For example, FIG. 12A illustrates an example in which 1202 to 1205 in an imaging area 1201 are detected as a predetermined object in step 1102, and effective relevant information is acquired for 1202, 1204, and 1205 in step 1103. 1206 to 1208 are the candidate marks, the image processing unit 104 generates images as the candidate marks, and the display control unit 105 displays the candidate marks to overlap the corresponding predetermined objects. The shape of the candidate mark is not limited to the shape illustrated in FIG. 12A as long as the candidate mark has the size that can be recognized by the user, and an associated predetermined object can be determined.

Then, in step 1105, determination of a display trigger is performed. In this case, similarly to the above embodiments, a "hand" is registered as the display trigger. In FIG. 12A, since there is no display trigger in the imaging area 1201, only the candidate marks 1206, 1207, and 1208 are displayed, and the display of the second image related to the relevant information of each predetermined object is not performed.

On the other hand, as illustrated in FIG. 12B, when a specific object 1209 serving as the display trigger is recognized in the imaging area 1201 and detected to approach the predetermined object 1202, in step 1106, the image processing unit 104 generates a second image 1210 as the relevant information of the predetermined object 1202 specified by the display trigger, and the second image 1210 is displayed through the display control unit 105 instead of the candidate mark 1206.

In this case, the predetermined object 1202 are close to the other objects 1203 to 1205. For this reason, the second image 1210 is displayed to overlap a part of the predetermined object 1202. Thus, an object associated with the second image 1210 is explicitly displayed. In the other embodiments, in order to explicitly display an object associated with the second image, the second image may be displayed to overlap a part of an associated object.

Similarly to the above embodiments, content displayed as the second image 1210 is the product information related to the predetermined object 1202, and for example, the reviews information or the market price information related to the product is displayed in the form easily recognized by the user. The displayed content is preferably information useful for the user and not particularly limited. The candidate marks 1207 and 1208 indicate the state in which the associated objects are not selected, and thus the candidate marks are continuously displayed without change. A broken line of the imaging area 1201 is illustrated for the sake of convenience and not displayed within the field of vision of the user.

In step 1107, the determination of the display trigger is continuously performed, and the relevant information is displayed while the display trigger is being recognized (Yes in step 1107). Further, when the position of the display trigger is changed, and a predetermined object close to the display trigger is changed, the candidate mark for the changed predetermined object is replaced to the display of the second image related to the relevant information. Further, the predetermined object before the change is replaced from the second image related to the relevant information to the candidate mark display. When the specific object 1209 serving as the display trigger is hardly recognized in the imaging area 1201 (No in step 1107), in step 1108, the second image display related to the relevant information ends, and the process returns to the detection of the predetermined object in step 1102. However, the candidate mark displayed in the imaging area 1201 is continuously displayed.

As described above, according to the fourth embodiment, in the wearable information display terminal 101, the candidate mark is displayed before the relevant information display of the predetermined object, and thus the user can recognize an object whose relevant information can be displayed in advance. For the relevant information, the display of the second image starts or ends using the display trigger, and thus the display of the second image can be performed at a timing and a period of time in which the will or action of the user is reflected. The user can use both hands freely in the state in which the information display terminal is worn and cause the display of the second image to be performed while recognizing an object whose relevant information can be displayed. Further, the user need not operate the information display terminal 101 to select an object, and thus convenience is improved.

As a modified example of the present embodiment, an embodiment in which the size or the color of the candidate marks 1206 to 1208 in FIG. 12A is changed according to validity of content of the relevant information is considered. Since each relevant information is acquired at a point in time at which the candidate mark is displayed, for example, when an amount of additional information is large or when a product is designated by the user in advance, a display mark is enlarged or framed in a reddish color. As a result, the user can easily recognize it in advance.

In the present embodiment, the example in which the operation of displaying the candidate mark is performed in combination with the first embodiment has been described, but the operation of displaying the candidate mark may be performed in combination with the other embodiments.

All the above embodiments have been described in connection with the example in which, when the user shops around a product in a store, particularly, a clothing store, the information display terminal displays the relevant information about the predetermined object as the second image. However, the application scene is not limited thereto, and the present invention can be applied to information display in different categories of stores or outdoors. The example in which the "hand" is used as the display trigger has been described, but any other things may be designated as the display trigger.

The present invention is not limited to the above embodiments, and various modified examples are included. For example, the above embodiments have been described to facilitate understanding of the present invention, and the present invention is not limited to a configuration necessarily including all components described above. All or some of the above-described functions or the processing units may be implemented by hardware or may be implemented by software by interpreting and executing a program for implementing the functions through a processor. A control line or an information line is considered to be necessary for description and illustrated, and all control lines or information lines are not necessarily illustrated.

REFERENCE SIGNS LIST

101, 504 Information display terminal
102 Control unit
103 Imaging unit
104 Image processing unit
105 Display control unit
106 Audio input/output unit
107 Audio processing unit
108 Communication processing unit
109 Communication input/output unit
110 Position detecting unit
111 Sensor input/output unit
112 Various kinds of sensors
201 User
202, 401, 701, 801, 1001, 1201 Imaging area
203 Image area
402, 802, 1002, 1202 Predetermined object
406, 805, 1007, 1210 Image of relevant information
407, 804, 1209 Display trigger
501 Internet
502 Personal computer
503 Mobile terminal
505 Server
506 Storage
702 Registration frame
1006 Gazing point
1206, 1207, 1208 Candidate mark.

The invention claimed:

1. A method for displaying information in a field-of-vision direction of a user on a head mounted display apparatus, the method comprising:
    imaging, by a camera provided on the head mounted display apparatus, in the field-of-vision direction; and
    communicating between the head mounted display apparatus and an information terminal;
    detecting, by the information terminal, a first object from a first image imaged by the camera;
    acquiring, by the information terminal, relevant information of the first object over a network;
    generating, by the information terminal, a second image from the acquired relevant information;
    imaging a third image by the camera;
    designating, by the information terminal, a second object positioned in a predetermined area of the third image;
    registering, by the information terminal, information identifying the second object as a trigger by which the second image is displayed;
    detecting, by the information terminal, that the second object has been imaged by the camera using the registered information of the second object; and in response to the detected second object being determined to be at a position close to the first object, displaying, by the head mounted display apparatus, the second image.

2. The method for displaying information according to claim 1, further comprising:

in response to the relevant information of the first object being acquired over the network prior to the detection of the second object;

generating, by the information terminal, a specific mark image related to the first object;

displaying, by the head mounted display apparatus, the specific mark image to overlap a part of the first object; and in response to the detected second object being determined to be at the position close to the first object, displaying, by the head mounted display apparatus, the second image in place of the specific mark image.

3. The method for displaying information according to claim 1, wherein the second image is displayed to overlap a part of the first object.

4. The method for displaying information according to claim 1, further comprising:

stopping, by the head mounted display apparatus, the display of the second image in response to the detected second object being determined to have moved away from the position close to the first object.

* * * * *